Patented Aug. 19, 1952

2,607,731

UNITED STATES PATENT OFFICE 2,607,731

OIL-BASE DRILLING FLUIDS

Paul W. Fischer, Whittier, Calif., assignor to Union Oil Company of California, Los Angeles, Calif., a corporation of California No Drawing. Application December 26, 1950, Serial No. 202,803

10 Claims. (Cl. 252—8.5)

This invention relates to drilling fluid compositions such as are employed in drilling oil and gas wells, and in particular concerns drilling fluids of the non-aqueous or oil-base type.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and then upwardly to the surface through the annular space between the drill stem and the wall of the bore hole. The drilling fluid serves a number of purposes, among which are cooling and lubricating the drill bit, suspending and removing cuttings from the hole, preventing the flow of liquids from the formations traversed by the bore into the same by applying hydrostatic pressure to such formations, and fulfilling other requirements.

In locations where the underground formations traversed and/or penetrated by the bore contain materials such as hydratable clays which swell and/or disintegrate in the presence of water, it has become customary to employ drilling fluids which are substantially free of water. Such fluids are termed "oil-base" fluids since they usually comprise a mineral oil having dispersed or suspended therein minor proportions of various agents adapted to impart special properties to the composition. Among such agents, those most universally employed are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents which serve to maintain solid components of the fluid uniformly dispersed therein. Oil-base drilling fluids may also comprise a variety of other agents such as gel strength improvement agents, viscosity-modifiers, emulsifying agents, protective colloids, inorganic salts, etc.

Of the various properties requisite to a satisfactory drilling fluid, that of coating the walls of the bore with a thin impermeable solid layer is one of the most important. Such layer serves to prevent loss of the drilling fluid into porous formations traversed by the bore. As previously mentioned, this property may be attained by including in the composition a relatively small proportion; e. g., 0.1–10 per cent by weight, of a clay such as bentonite or an asphaltic material. The effectiveness of such agent in preventing escape of the fluid into permeable formations is conveniently measured by determining the so-called "filtration rate" or "fluid loss value." Such determination consists of a simple filtration test wherein a sample of the drilling fluid is forced against a permeable membrane or filter under standardized conditions of temperature and pressure. The quantity of filtrate obtained after a given period of time is taken as the filtration rate value, usually expressed in milliliters/hour. Detailed procedure for making this determination is set forth in "Recommended Practice on Field Procedure for Testing Drilling Fluids," API Code No. 29, July 1942. Ordinarily, it is desirable that the drilling fluid have a filtration rate below about 4.0 ml./hr.

A second most important property of a satisfactory drilling fluid is that of gel strength. One of the functions of the fluid is to carry the cuttings produced at the working face of the bore hole up to the surface where they are separated and discarded. Accordingly, it is necessary that the composition possesses sufficient "body" to maintain the cuttings suspended therein. On the other hand, the composition must be sufficiently fluid to be readily pumped. The necessary degree of "body" or fluidity is attained by formulating the composition so that it takes the form of a thin gel which preferably has the property of thixotropy, i. e., the property of being relatively fluid during agitation but capable of setting up into a gel when allowed to stand quiescent. The gel characteristics of a drilling fluid are usually expressed by means of initial and 10-minute gel strength characteristics which are likewise determined as described in the aforementioned API Code No. 29. Ordinarily, it is desirable that the fluid have an initial gel strength value of at least about 3 lbs./100 sq. ft., and a 10-minute gel strength value of at least about 6 lbs./100 sq. ft.

While the dispersing agent component of oil-base drilling fluids serves primarily to maintain solid constituents uniformly and stably dispersed in the oil phase, it has been found that in the fluids comprising a hydratable clay wall-building agent the dispersing agent is of great influence on the fluid loss and gel strength values of the fluid. For this reason, considerable effort has been expended in searching for dispersing agents which have optimum influence on the fluid loss and gel strength characteristics of the composition as well as highly desirable dispersing properties. Among such dispersing agents, those prepared from certain modified rosin soaps are superior to many others, and the drilling fluid compositions comprising dispersing agents of this type have met with considerable commercial success. Such drilling fluids are described and claimed in my copending application, Serial No. 105,067, filed July 15, 1949, now U. S. Patent 2,542,020, and are prepared by dispersing in mineral oil minor amounts each of an alkali-metal alkali partial saponification product of a heat-treated rosin, an alkaline-earth metal base, a hydratable clay, and water. Two particular types of saponified rosin products are especially preferred. The first of such types comprises the alkali-metal alkali partial saponification products of wood rosin which has been heat-treated under conditions of time and temperature sufficient to raise its specific rotation to a value above about +5° and to effect a substantial degree of decarboxylation, said product containing between about 1 and about 15 per cent by weight of free resin acids. This type of product is for convenience referred to herein as "partially saponified decarboxylated rosin." A particularly preferred product of this type is that obtained by saponifying with aqueous potassium hydroxide a wood rosin which has been heated at temperatures between about 250° and about 350° C. for a length of time sufficient to raise its specific rotation to a value above about +5° and to effect a substantial degree of decarboxylation, and comprises between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water.

The second of the preferred types of saponified rosin products comprises the alkali-metal alkali partial saponification products of rosin which has been heated in the presence of a hydrogenation catalyst but in the absence of added hydrogen under conditions of time and temperature sufficient to raise its specific rotation to a value above about +5°, said product containing between about 1 and about 15 per cent by weight of free resin acids. This type of product is for convenience referred to herein as "partially saponified disproportionated rosin" since the heat-treatment in the presence of the hydrogenation catalyst effects a change in the relative proportion of abietic-type acids present in the rosin. A particularly preferred product of this type is that prepared by heating rosin at a temperature between about 225° and about 300° C. for about 15 to about 60 minutes in the presence of a palladium hydrogenation catalyst but in the absence of added hydrogen, distilling the resulting product and collecting a fraction distilling at about 210°–275° C. under about 5–10 mm. pressure, and thereafter saponifying such fraction in the known manner with such a deficiency of aqueous sodium hydroxide that the saponified product has an acid number of about 15–16. Such product is available commercially under the trade-name "Dresinate 731."

While both partially saponified decarboxylated rosin and partially saponified disproportionated rosin have proven to be highly superior for use in oil-base drilling fluids of the present type, they differ considerably in their respective effect on the fluid loss and gel strength characteristics of the drilling fluid compositions in which they are employed. The compositions which comprise partially saponified decarboxylated rosin are characterized by excellent fluid loss values, often as low as 0.0 ml./hr., but are deficient in gel strength. Accordingly, it is usually found necessary to employ in such compositions an auxiliary gel strength improvement agent such as sodium silicate. On the other hand, the drilling fluid compositions comprising partially saponified disproportionated rosin have excellent gel strength properties but leave something to be desired in the way of fluid loss characteristics. Such compositions are satisfactory for use in drilling through relatively non-porous strata but are not particularly suitable for use in more permeable formations.

The foregoing differences between drilling fluids comprising the two different types of partially saponified modified rosin products are not particularly apparent from laboratory determinations of the fluid loss and gel strength value. However, these differences are very readily observed during actual drilling operations. This lack of correlation between laboratory and field observations is probably due in part to the fact that laboratory test samples are usually prepared and tested under ideal conditions, whereas large batches of drilling fluid prepared in the field may inadvertently vary in composition, homogeneity, etc. Also, the properties of the composition may change somewhat with use since during such use the composition is subjected to a wide range of pressure and temperature conditions, and may have to operate in formations of widely varying porosity.

It is accordingly an object of the present invention to provide means for overcoming the deficiencies of the hydratable clay-containing oil-base drilling fluids which comprise either partially saponified decarboxylated rosin or partially saponified disproportionated rosin.

Another object is to provide means for improving the gel strength properties of the hydratable clay-containing oil-base drilling fluids which comprise partially saponified decarboxylated rosin.

A further object is to provide means for improving the fluid loss characteristics of the hydratable clay-containing oil-base drilling fluids which comprise partially saponified disproportionated rosin.

A still further object is to provide drilling fluids of the type which comprises a mineral oil dispersion of a hydratable clay, an alkaline-earth metal base and a partially saponified modified rosin which display superior fluid loss and gel strength properties under conditions of actual use.

Other objects will be apparent from the following detailed description of the invention, and many advantages not specifically referred to herein will occur to those skilled in the art upon employment of the invention in practice.

I have now found that the above and related objects may be realized in drilling fluid compositions comprising a mixture of partially saponified decarboxylated rosin and partially saponified disproportionated rosin. More particularly, I have found that partially saponified decarboxylated rosin and partially saponified disproportionated rosin supplement each other with respect to the influence they exert on the fluid loss and gel strength characteristics of hydratable clay-containing oil-base drilling fluids. Ordinarily, it would be expected that a drilling fluid which comprises a mixture of these two types of partially saponified modified rosin would have fluid loss and gel strength characteristics representing an average between those of drilling fluids comprising each of such products by itself. Thus, while it might be expected that the fluid loss properties of a composition comprising partially saponified disproportionated rosin could be improved by replacing a part of the partially saponified disproportionated rosin with partially saponified decarboxylated rosin, it would also be expected that such improvement could be secured only at the expense of the excellent gel strength properties which are characteristically imparted by the partially saponified disproportionated rosin. Conversely, it would be expected that the gel strength properties of compositions comprising partially saponified decarboxylated rosin could be improved only at the expense of the excellent fluid loss properties which are characteristic of this type of partially saponified modified rosin. I have found, however, that these two types of partially saponified modified rosin display unusual behavior in the presence of each other. Contrary to expectations, each makes up for the deficiencies of the other without suffering any impairment of its own desirable characteristics. Thus, it has been found that a hydratable clay-containing oil-base drilling fluid which contains a mixture of partially saponified decarboxylated rosin and partially saponified disproportionated rosin possesses to full degree the excellent fluid loss properties which are characteristic of similar compositions comprising only partially saponified decarboxylated rosin, and at the same time possesses to full degree the excellent gel strength properties which are characteristic of compositions which comprise only the partially saponified disproportionated rosin.

The invention thus consists in oil-base drilling fluid compositions prepared by dispersing in mineral oil a minor proportion each of partially saponified decarboxylated rosin, partially saponified disproportionated rosin, and an alkaline-earth metal base, a hydratable clay, and water. These compositions are complex colloidal systems whose exact chemical composition is made uncertain by the fact that certain of the components react with each other to an unknown extent. Accordingly, these compositions are herein described and claimed by their method of preparation rather than in terms of their chemical composition which at best can be only speculative.

The base oil which forms the major component of the new compositions is preferably of mineral origin and may be crude petroleum or a distillate or residuum material. Heavier materials such as light tars, cracked residua, heavy extracts, and the like are especially well suited, particularly when blended with a light distillate such as gas oil, diesel fuel, etc. A highly satisfactory mixed base of this type comprises a major proportion, e. g., 60–90 per cent, of a relatively heavy oil such as a light residual oil having a specific gravity of about 13°–15° API and a viscosity of about 30–40 seconds SSF at 122° F. and containing a substantial proportion of asphaltenes, polymeric bodies and the like, and a minor proportion, e. g., 10–40 per cent, of a light distillate such as a diesel fuel having a specific gravity of about 25°–35° API and a viscosity of about 30–50 seconds SUS at 100° F. The invention, however, is not limited to the use of any particular types of oil or mixtures thereof, and any of the oil bases known in the art may be satisfactorily employed.

The alkaline-earth metal base component may be any oxide, hydroxide or basic salt of any of the alkaline-earth metals, e. g., calcium oxide, calcium hydroxide, barium hydroxide, strontium hydroxide, calcium acetate, etc. Mixtures of alkaline-earth metal bases may also be employed. Calcium hydroxide, i. e., ordinary hydrated lime, and calcium oxide (quicklime) are preferred by reason of their low cost and general availability.

The hydratable clay component is preferably a high quality material such as bentonite, montmorillonite, or kaolinite, but may be common clay such as is available in almost any locality. Bentonite, however, is preferred. Similarly, the water component should be substantially pure or "fresh," since highly saline water or brines have an adverse effect on the stability of the composition.

The partially saponified decarboxylated rosin component is the product obtained by reacting rosin, which has previously been heat-treated to effect a substantial degree of decarboxylation, with an aqueous alkali-metal alkali, e. g., sodium hydroxide, sodium carbonate, potassium hydroxide, etc., in such manner that the saponification reaction is only partially complete and the saponified product contains from about 1 to about 15 per cent of free unsaponified resin acids. The heat-treatment of rosin to effect decarboxylation is well known in the naval stores art. Usually, such heat-treatment is carried out simply by heating any of the various color grades of refined gum or wood rosin, usually the latter, in a non-oxidizing atmosphere under conditions of time and temperature sufficient to secure the desired degree of decarboxylation and consequent formation of unsaponifiable rosin oils. In addition to effecting decarboxylation, such treatment also isomerizes and/or otherwise modifies the non-decarboxylated resin acids, and effects an increase in the specific rotation of the rosin and a decrease in its olefinic unsaturation. Thus, for example, wood rosin may be heated at about 250°–350° C. for from 1 to 4 hours to obtain a decarboxylated rosin product which contains 20–50 per cent of unsaponifiable rosin oils, and which has a specific rotation above about +15° in contrast to the low unsaponifiable oil content and the negative specific rotation of the original rosin. In the practice of the present invention, the partially saponified decarboxylated rosin product should be one obtained from rosin which has been decarboxylated to such an extent that it contains between about 20 and about 50 per cent by weight of unsaponifiable oils. A typical decarboxylated rosin product of this type comprises 50–60 per cent by weight of free resin acids, 30–40 per cent by weight of unsaponifiable oils, and small amounts of phenolic materials, water, and products of unknown constitution.

Saponification of decarboxylated rosin to form the partially saponified decarboxylated rosin product employed in the practice of the present invention may be carried out in any of the ways commonly employed in the art for the saponification of ordinary rosin. Usually, the procedure consists merely in adding the decarboxylated rosin in the solid or molten state to a hot aqueous solution of the desired alkali-metal alkali, and thereafter heating the mixture until the reaction is complete and the product contains the desired amount of water. The amount of alkali employed is somewhat less than that required for complete saponification of the resin acids in order that the saponification may contain the requisite amount of free unsaponified resin acids, i. e., between about 1 and about 15 per cent by weight. The concentration of the aqueous alkali is usually adjusted so that the product contains sufficient water to render it capable of being handled as a fluid. The previously described potassium hydroxide partial saponification product of decarboxylated rosin is preferred for use in practice of the present invention.

The partially saponified disproportionated rosin component of the new compositions is the product obtained by partially saponifying disproportionated rosin with an aqueous alkali-metal alkali as described above in connection with the partial saponification of decarboxylated rosin. Disproportionated rosin is obtained by heat-treating wood or gum rosin in the presence of a hydrogenation catalyst, e. g., metallic platinum or palladium, but in the absence of added hydrogen as described, for example, in U. S. Patent 2,154,629. Usually, the heat-treatment is effected at temperatures between about 150° and about 300° C. for about 15 minutes to about 5 hours. If desired, the product may be purified by fractional distillation under vacuum. A partially saponified disproportionated rosin product which is particularly preferred for use according to the present invention is the previously-described "Dresinate 731."

The proportions in which the various essential components are employed in preparing the new compositions may be varied between certain limits depending upon the specific properties desired in the composition. Ordinarily, however, the mixed partially saponified rosin product is employed in an amount representing between about 0.2 and about 10, preferably between about 2 and about 8, per cent by weight of the entire composition. Such mixed product should consist of from about 50 to about 75 per cent by weight of partially saponified disproportionated rosin and, correspondingly, from about 25 to about 50 per cent by weight of partially saponified decarboxylated rosin. A mixture consisting of about 2 parts by weight of the former and about 1 part by weight of the latter has been found to combine best the desirable properties of the two types of saponification products. The alkaline-earth metal base is employed in an amount representing between about 0.1 and about 5, preferably between about 0.4 and about 2, per cent by weight of the entire composition depending upon its chemical identity, and is usually provided in an amount slightly in excess of the quantity chemically equivalent to the resin acid soaps present in the saponified modified rosin mixture. The hydratable clay is provided in an amount representing between about 0.1 and about 5, preferably between about 0.4 and about 1.2, per cent by weight of the entire composition, and the water is provided in an amount representing between about 0.2 and about 10, preferably between about 1 and about 5, per cent by weight of the entire composition. These proportions of water include any water which may be contained in the mixture of partially saponified modified rosins, and the amount of water actually added during preparation of the composition should be adjusted accordingly, so that the final composition contains water in the given proportions.

The exact manner and order in which the saponified rosin, alkaline-earth metal base, hydratable clay and water are dispersed in the base oil are not of primary importance, and if desired the requisite amounts of each of these ingredients may simply be added to the entire quantity of the base oil at ordinary temperatures while employing more or less vigorous agitation or stirring to secure a uniform composition. Such operation may be carried out at the well site in the conventional mud pits with agitation being effected by circulating the mixture from one pit to another. However, I have found that a more convenient mode of preparation which provides more highly uniform compositions consists in forming an intermediate concentrate composition which is subsequently diluted with the base oil to obtain the finished drilling fluid. According to one mode of operation, the alkaline-earth metal base is suspended in a portion of the base oil, after which the partially saponified modified rosin product is added with vigorous stirring. The hydratable clay and water are then added to the mixture, either separately or together, and stirring is continued to obtain a homogeneous concentrate composition. Such composition can be diluted with the remainder of the base oil at any subsequent time to obtain the finished product. According to an alternative and preferred procedure, the saponified modified rosin product is dispersed in a part of the base oil, after which the hydratable clay and water are added with vigorous stirring to obtain a homogeneous composition. When the base oil comprises a mixture of a light and a heavy oil as previously described, it is preferred that the light oil component be employed in forming the initial dispersion of the saponified rosin, hydratable clay and water. Such dispersion forms a concentrate composition which, if desired, can be stored and shipped as such and subsequently be combined with the alkaline-earth metal base and be diluted with the remainder of the base oil to obtain the finished product. This procedure may be employed in preparing a preferred composition as follows: 150–250 parts by weight of the previously described potassium hydroxide saponification product of decarboxylated wood rosin, 250–350 parts by weight of the previously described sodium hydroxide saponification product of distilled disproportionated rosin, 50–55 parts by weight of bentonite, and 35–40 parts by weight of water are dispersed in 1000 parts by weight of the light distillate hereinbefore described to form a concentrate composition which can be stored indefinitely. When it is desired to form the finished drilling fluid, for example at the well site, 50–55 parts by weight of hydrated lime are stirred into the concentrate composition and stirring is continued for ½ to 2 hours, after which there is then added 6500–7000 parts by weight of the previously described heavy oil. If desired, a part of the light oil, e. g., 50–75 per cent, may be withheld from the concentrate composition and later added along the hydrated lime.

In many instances it will be desired that the composition contain a weighting agent to increase its apparent density and thus render it capable of providing a greater hydrostatic head within the bore hole during use. Such agent is preferably added to the composition upon completion of the procedure described above, and may be employed in amounts sufficient to provide a composition having an apparent density from about 65 lbs./cu. ft. to as high as 130 lbs./cu. ft. Suitable weighting agents include finely divided whiting, barytes, iron oxides, lead dust, fuller's earth, calcined clay, calcium carbonate, and other high density inert solid materials. Also, if desired, the new compositions may optionally contain small amounts of other agents, such as carbohydrate or protein colloids for improving stability, viscosity modifiers, and any of the other additive agents commonly employed in oil-base drilling fluid formulation.

The following example illustrates one way in which the principle of the invention has been applied but is not to be construed as limiting the same:

EXAMPLE

A. *Drilling fluid comprising partially saponified decarboxylated rosin*

|  | Weight, Lbs. |  |
|---|---|---|
| Domestic Diesel Fuel | 10,645 | 57.5 bbls. |
| Light Domestic Fuel Oil | 100,000 | 290 bbls. |
| Saponified Decarboxylated Rosin | 5,230 | 11.3 drums. |
| Hydrated Lime | 1,300 | 13×100 lb. sacks. |
| Bentonite | 400 | 4×100 lb. sacks. |
| Water | 6,250 | 17.5 bbls. |

The diesel fuel was a typical light domestic diesel oil having an API gravity of 31.0°, a viscosity of 40 SUS at 100° F. and a boiling range of 400°–720° F. The light domestic fuel oil had an API gravity of 14.5°, a viscosity of 36 SSF at 122° F., and a flash point of 170° F. The saponified decarboxylated rosin contained 45–55 per cent of potassium resin acid soaps, 30–35 per cent of unsaponifiable rosin oils, 5–10 per cent of free resin acids and 5–10 per cent of water.

The clay was suspended in the water, and the lime, saponified decarboxylated rosin product, and a clay suspension were then stirred into the diesel fuel. The fuel oil was then added, and stirring by circulation was continued until the product became homogeneous. The drilling fluid had the following characteristics:

Marsh viscosity at 80° F. _____ 225 seconds
Fluid loss, ml./hr. _____ Nil
Gel strength, lbs./100 sq. ft. _____ 2

This fluid was employed in the drilling into the producing formation of a well in the Dominguez field in Southern California. The initial viscosity of the fluid dropped to a value of about 130 secs. during the first three hours of drilling, and varied only slightly from this value during the remainder of the 4-day drilling period. The fluid loss and gel strength values remained constant during this period. While performance of the fluid was particularly satisfactory from the standpoint of fluid loss, some difficulty was experienced by reason of its low gel strength. It will be noted that the fluid was unweighted. Considerably greater difficulties and even relatively unsatisfactory operation are encountered when drilling conditions require the use of weighting agents, for in such instances the fluid does not possess sufficient gel strength to keep even the weighting agent from settling out in the mud pits.

B. *Drilling fluid comprising partially saponified disproportionated rosin*

Approximately 480 bbls. of a drilling fluid were prepared according to the formulation described above in Section A, except that partially saponified disproportionated rosin (Dresinate 731) was substituted for the partially saponified decarboxylated rosin, and sufficient 400-mesh whiting was added to raise the apparent density of the fluid to about 70 lbs./cu. ft. This fluid was employed in drilling into the producing formation of a well at depths of 7830–8060 feet. During a 3-day drilling period, the viscosity of the fluid averaged about 250 seconds. The gel strength characteristics were excellent, being about 3 lbs./100 sq. ft. in the line (i. e., during circulation) and about 20 lbs./100 sq. ft. in the mud pits. Substantially no material settled out of the fluid in the pits, and during the entire 8-day operation it was not necessary to clean the pits. The only evidence of settling was a thin layer of solids in the ditch and in the tray under the shaker screen. The weight of such layer of settled solids amounted only to about 1.2 per cent of the total amount of solids in the fluid. However, the fluid had a fluid loss value of about 6 ml./hr. Recovery of the fluid was accordingly not entirely satisfactory and necessitated the addition of further quantities of lime and bentonite. Even with such modification the overall recovery of the fluid was only about 88%.

C. *Drilling fluid comprising mixture of partially saponified decarboxylated rosin and partial saponified disproportionated rosin*

Approximately 400 bbls. of a drilling fluid were prepared according to the formulation described above in Section A, except the dispersing agent consisted of equal parts by weight of partially saponified decarboxylated rosin and partially saponified disproportionated rosin (Dresinate 731), and sufficient 400-mesh whiting was added to raise the apparent density of the fluid to about 70 lbs./cu. ft. This fluid was employed in drilling into the producing formation of a well located in the same general district as those referred to above. The viscosity of the fluid remained substantially constant at about 160–180 seconds during the entire drilling period, and the fluid displayed excellent gel strength properties. Substantially no solids settled out, and in general the behavior of the fluid with respect to gel strength was substantially identical with that of the fluid described in Section B, above. The fluid loss value was 0.0 ml./hr. at 100° F., and in this respect the fluid was substantially identical with the fluid described in Section A, above.

It will be noted from the preceding example that the fluid comprising the mixture of the two types of partially saponified modified rosin had fluid loss properties superior to those of the fluid which comprised partially saponified disproportionated rosin, and gel strength properties superior to those of the fluid which comprised partially saponified decarboxylated rosin. Such fluid accordingly combines the desirable characteristics of each type of dispersing agent and excludes their respective undesirable properties.

Other modes of applying the principle of my invention may be employed instead of those explained, change being made as regards the methods or materials disclosed, provided the composition stated by any of the following claims, or the equivalent of such stated composition be obtained.

I, therefore, particularly point out and distinctly claim as my invention:

1. A drilling fluid composition prepared by dispersing in mineral oil: between about 0.1 and about 5 per cent by weight of a hydratable clay; between about 0.1 and about 5 per cent by weight of an alkaline-earth metal base; between about 0.2 and about 10 per cent by weight of water; and between about 0.2 and about 10 per cent by weight of a dispersing agent essentially comprising (1) between about 50 and about 75 per cent by weight of the product obtained by saponifying with an aqueous alkali-metal alkali a disproportionated rosin obtained by heating rosin in the presence of a hydrogenation catalyst but in the absence of added hydrogen at a temperature between about 150° C. and about 300° C. for a period of time sufficient to raise its specific rotation to a value above about +5° and to effect a substantial degree of disproportionation, said product containing between about 1 and about 15 per cent by weight of free resin acids, and (2) between about 25 and about 50 per cent by weight of the product obtained by saponifying with an aqueous alkali-metal alkali a decarboxylated rosin obtained by heating rosin at a temperature between about 250° C. and about 350° C. for a period of time sufficient to raise its specific rotation to a value above about +5° and to effect a substantial degree of decarboxylation, said product containing between about 1 and about 15 per cent by weight of free resin acids.

2. A composition according to claim 1 wherein the alkaline-earth metal base is hydrated lime.

3. A composition according to claim 1 wherein the alkaline-earth metal base is calcium oxide.

4. A composition according to claim 1 containing sufficient of an inorganic solid weighting agent to provide the composition with an apparent density between about 65 and about 130 pounds per cubic foot.

5. A composition according to claim 1 wherein the dispersing agent essentially comprises (1) between about 50 and about 75 per cent by weight of partially saponified disproportionated rosin prepared by heating rosin at a temperature between about 225° and about 300° C. for about 15 to 60 minutes in the presence of a hydrogenation catalyst but in the absence of added hydrogen, distilling the resulting product and collecting a fraction distilling between about 210° and about 275° C. under 5-10 mm. pressure, and saponifying said fraction with such a deficiency of aqueous sodium hydroxide that the saponified product contains between about 1 and about 15 per cent of free resin acids, and (2) between about 25 and about 50 per cent by weight of a potassium hydroxide saponification product of decarboxylated rosin comprising between about 45 and about 55 per cent by weight of potassium resin acid soaps, between about 30 and about 35 per cent of unsaponifiable materials, between about 5 and about 10 per cent by weight of free resin acids, and between about 5 and about 10 per cent by weight of water.

6. A composition according to claim 5 wherein the alkaline-earth metal base is hydrated lime.

7. A composition according to claim 5 wherein the alkaline-earth metal base is calcium oxide.

8. A composition according to claim 5 wherein the mineral oil comprises 60–90 per cent of a light residual oil having a specific gravity of about 13°–15° API, a viscosity of about 30–40 seconds SSF at 122° F., and containing a substantial proportion of asphaltenes and polymeric bodies, and 10–40 per cent of a light distillate having a specific gravity of about 25°–35° API and a viscosity of about 30–50 seconds SUS at 100° F.

9. A composition according to claim 5 containing sufficient of an inorganic solid weighting agent to provide the composition with an apparent density between about 65 and about 130 pounds per cubic foot.

10. A composition according to claim 5 wherein the dispersing agent is employed in an amount representing between about 2 and about 8 per cent by weight of the entire composition; the alkaline-earth metal base is employed in an amount representing between about 0.4 and about 2 per cent by weight of the entire composition; the hydratable clay is employed in an amount representing between about 0.4 and about 1.2 per cent by weight of the entire composition; and the water is employed in an amount representing between about 1 and about 5 per cent by weight of the entire composition.

PAUL W. FISCHER.

REFERENCES CITED

The following references are of record in the file of this patent:

UNITED STATES PATENTS

| Number | Name | Date |
|---|---|---|
| 2,463,823 | Weithkamp | Mar. 8, 1949 |
| 2,542,019 | Fischer | Feb. 20, 1951 |
| 2,542,020 | Fischer | Feb. 20, 1951 |